US012536017B2

(12) United States Patent
Chaudhury et al.

(10) Patent No.: US 12,536,017 B2
(45) Date of Patent: Jan. 27, 2026

(54) METHOD AND SYSTEM FOR RECOMMENDING AGILE SOFTWARE FRAMEWORK METHODOLOGY

(71) Applicant: JPMorgan Chase Bank, N.A., New York, NY (US)

(72) Inventors: Abhinandan Chaudhury, Bengaluru (IN); Rajendra Sarpal, Bareilly (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 228 days.

(21) Appl. No.: 18/393,124

(22) Filed: Dec. 21, 2023

(65) Prior Publication Data

US 2025/0130791 A1 Apr. 24, 2025

(30) Foreign Application Priority Data

Oct. 23, 2023 (IN) .............................. 202311072287

(51) Int. Cl.
  *G06F 9/44* (2018.01)
  *G06F 8/10* (2018.01)
  *G06F 8/77* (2018.01)
(52) U.S. Cl.
  CPC . *G06F 8/77* (2013.01); *G06F 8/10* (2013.01)
(58) Field of Classification Search
  CPC ...................................... G06F 8/77; G06F 8/10
  See application file for complete search history.

(56) References Cited

U.S. PATENT DOCUMENTS

| | | | |
|---|---|---|---|
| 2012/0159441 A1* | 6/2012 | Ghaisas | G06F 8/10 |
| | | | 717/123 |
| 2017/0083290 A1* | 3/2017 | Bharthulwar | G06F 8/71 |
| 2018/0210709 A1* | 7/2018 | Bharthulwar | G06F 8/77 |
| 2023/0186203 A1* | 6/2023 | Kulkarni | G06Q 10/06313 |
| | | | 705/7.22 |
| 2024/0220928 A1* | 7/2024 | Vadel | G06Q 10/063118 |

* cited by examiner

*Primary Examiner* — Qamrun Nahar
(74) *Attorney, Agent, or Firm* — GREENBLUM & BERNSTEIN, P.L.C.

(57) ABSTRACT

A method and a system for recommending agile software framework methodology are disclosed. The method includes receiving at least one input from a user. The method further includes analyzing the at least one input to authenticate and authorize the at least one input. Further, the method includes recommending at least one agile software framework methodology with an associated confidence score. The method further includes receiving a response input from the user on the recommended agile software framework methodology. Further, the method includes creating a set of tasks for the recommended agile software framework methodology based on a positive response from the user on the recommended agile software framework. Thereafter, the method includes executing the set of tasks associated with the recommended agile software frame methodology for development of a software.

20 Claims, 6 Drawing Sheets

METHOD AND SYSTEM FOR RECOMMENDING AGILE SOFTWARE FRAMEWORK METHODOLOGY

CROSS-REFERENCE TO RELATED APPLICATIONS

This application claims priority benefit from Indian Application No. 202311072287, filed on Oct. 23, 2023 in the India Patent Office, which is hereby incorporated by reference in its entirety.

FIELD OF THE DISCLOSURE

This technology generally relates to agile software development, and more particularly to methods and systems for recommending an agile software framework methodology via a recommendation engine.

BACKGROUND INFORMATION

The following description of the related art is intended to provide background information pertaining to the field of the present disclosure. This section may include certain aspects of the art that may be related to various features of the present disclosure. However, it should be appreciated that this section is used only to enhance the understanding of the reader with respect to the present disclosure, and not as admission of the prior art.

As is generally known, software product development revolves around a framework for managing a product development life cycle. As per current trends, an agile framework is a quite popular framework for software product development due to having a lot of methodologies. Further, each of the agile methodologies has its pros and cons, and due to this, the selection of the relevant methodology depends on various factors such as circumstances, maturity, complexity, nature of the project, requirements, and eco-systems. Moreover, each of the methodologies is typically voluminous in paper and requires very minute analysis in deciding or choosing the best-suited methodology.

The major drawback in the conventional process of selecting a framework methodology for a particular software development is personal bias on a specific methodology due to a lack of knowledge of the methodologies, or due to the impact of word of mouth, industry peer discussions, management discussions, and the like. This approach for selecting a framework methodology might be not best suited for the team and product and in turn might hamper product quality, timeline, cost, and mental wellness of team and management stakeholders. Moreover, the conventionally available systems and methods also failed to address human disabilities which makes them feel exclusive in every process of product development.

Hence, in view of these and other existing limitations, there arises an imperative need to provide an efficient solution to overcome the above-mentioned limitations and to provide a method and system for recommending an agile software framework methodology via a recommendation engine.

SUMMARY

The present disclosure, through one or more of its various aspects, embodiments, and/or specific features or sub-components, provides, inter alia, various systems, servers, devices, methods, media, programs, and platforms for recommending agile software framework methodology via a recommendation engine based on user inputs and feedbacks.

According to an aspect of the present disclosure, a method for recommending agile software framework methodology via an agile framework recommendation engine is disclosed. The method includes receiving, by at least one processor, at least one input from a user. Next, the method includes analyzing, by the at least one processor using a control mechanism engine, the at least one input to authenticate and authorize the at least one input. Next, the method includes recommending, by the at least one processor using the recommendation engine, at least one agile software framework methodology with an associated confidence score, wherein the recommendation of the at least one agile software framework is performed based on the analysis of the at least one input received from the user and based on an analysis of training data. Next, the method includes receiving, by the at least one processor, a response input from the user on the recommended agile software framework methodology. Next, the method includes creating, by the at least one processor using a squad agile engine, a set of tasks for the recommended agile software framework methodology based on a positive response from the user on the recommended agile software framework. Thereafter, the method includes executing, by the at least one processor using an action engine, the set of tasks associated with the recommended agile software frame methodology for development of a software.

In accordance with an exemplary embodiment, the at least one input is received as one of voice-based input, text-based input, sign language-based input, or any combination thereof.

In accordance with an exemplary embodiment, the at least one input comprises information associated with a software development team, information associated with requested completion timelines, and information associated with the various requirements in the development of the software.

In accordance with an exemplary embodiment, the training data comprises information associated with previous outcomes of different factors for different products, domains, combinations of resources, experience history, code commit history, behavior analysis, documentation, and feedback of users on the past recommendations or combinations thereof.

In accordance with an exemplary embodiment, the method further comprises ranking, by the at least one processor using the recommendation engine, a plurality of agile software framework methodology based on their corresponding confidence score; and displaying, by the at least one processor using the recommendation engine, the plurality of agile software framework methodology with their corresponding confidence score.

In accordance with an exemplary embodiment, the response input from the user on the recommended agile software framework methodology comprises one of the positive response to accept the recommended agile software framework methodology and a negative response to reject the recommended agile software framework, along with feedback on the corresponding response.

In accordance with an exemplary embodiment, assisting, by the at least one processor using an agile assistant feature, the user with a plurality of assistance tasks required for the recommendation and the execution of the agile software framework methodology.

According to another aspect of the present disclosure, a computing device configured to implement an execution of a method for recommending an agile software framework methodology is disclosed. The computing device includes a processor; a memory; and a communication interface coupled to each of the processor and the memory. The processor may be configured to receive at least one input from a user; analyze, using a control mechanism engine, the at least one input to authenticate and authorize the at least one input; recommend, using a recommendation engine, at least one agile software framework methodology with an associated confidence score, wherein the recommendation of the at least one agile software framework is performed based on the analysis of the at least one input received from the user and based on an analysis of training data; receive a response input from the user on the recommended agile software framework methodology; create, using a squad agile engine, a set of tasks for the recommended agile software framework methodology based on a positive response from the user on the recommended agile software framework; and execute, using an action engine, the set of tasks associated with the recommended agile software frame methodology for development of a software.

In accordance with an exemplary embodiment, the at least one input is received as one of voice-based input, text-based input, sign language-based input or any combination thereof.

In accordance with an exemplary embodiment, the at least one input comprises information associated with a software development team, information associated with requested completion timelines, and information associated with the various requirements in the development of the software.

In accordance with an exemplary embodiment, the training data comprises information associated with previous outcomes of different factors for different products, domains, combinations of resources, experience history, code commit history, behavior analysis, documentation, and feedback of users on the past recommendations or combinations thereof.

In accordance with an exemplary embodiment, the processor is further configured to rank, using the recommendation engine, a plurality of agile software framework methodology based on their corresponding confidence score; and display, using the recommendation engine, the plurality of agile software framework methodology with their corresponding confidence score.

In accordance with an exemplary embodiment, the response input from the user on the recommended agile software framework methodology comprises one of the positive response to accept the recommended agile software framework methodology and a negative response to reject the recommended agile software framework, along with feedback on the corresponding response.

In accordance with an exemplary embodiment, the processor is further configured to assist, using an agile assistant feature, the user with a plurality of assistance tasks required for the recommendation and the execution of the agile software frame methodology.

According to yet another aspect of the present disclosure, a non-transitory computer-readable storage medium storing instructions for recommending an agile software framework methodology is disclosed. The instructions include executable code which, when executed by a processor, may cause the processor to receive at least one input from a user; analyze, using a control mechanism engine, the at least one input to authenticate and authorize the at least one input; recommend, using a recommendation engine, at least one agile software framework methodology with an associated confidence score, wherein the recommendation of the at least one agile software framework is performed based on the analysis of the at least one input received from the user and based on an analysis of training data; receive a response input from the user on the recommended agile software framework methodology; create, using a squad agile engine, a set of tasks for the recommended agile software framework methodology based on a positive response from the user on the recommended agile software framework; and execute, using an action engine, the set of tasks associated with the recommended agile software frame methodology for development of a software.

In accordance with an exemplary embodiment, the at least one input is received as one of voice-based input, text-based input, sign language-based input, or any combination thereof. The at least one input comprises information associated with a software development team, information associated with requested completion timelines, and information associated with the various requirements in the development of the software.

In accordance with an exemplary embodiment, the training data comprises information associated with previous outcomes of different factors for different products, domains, combinations of resources, experience history, code commit history, behavior analysis, documentation, and feedback of users on the past recommendations or combinations thereof.

In accordance with an exemplary embodiment, when executed by the processor, the executable code may further cause the processor to rank, using the recommendation engine, a plurality of agile software framework methodology based on their corresponding confidence score; display, using the recommendation engine, the plurality of agile software framework methodology with their corresponding confidence score.

In accordance with an exemplary embodiment, the response input from the user on the recommended agile software framework methodology comprises one of the positive response to accept the recommended agile software framework methodology and a negative response to reject the recommended agile software framework, along with feedback on the corresponding response.

In accordance with an exemplary embodiment, when executed by the processor, the executable code may further cause the processor assist, using an agile assistant feature, the user with a plurality of assistance tasks required for the recommendation and the execution of the agile software frame methodology.

BRIEF DESCRIPTION OF THE DRAWINGS

The present disclosure is further described in the detailed description which follows, in reference to the noted plurality of drawings, by way of non-limiting examples of exemplary embodiments of the present disclosure, in which like characters represent like elements throughout the several views of the drawings.

DETAILED DESCRIPTION

Figure 1:
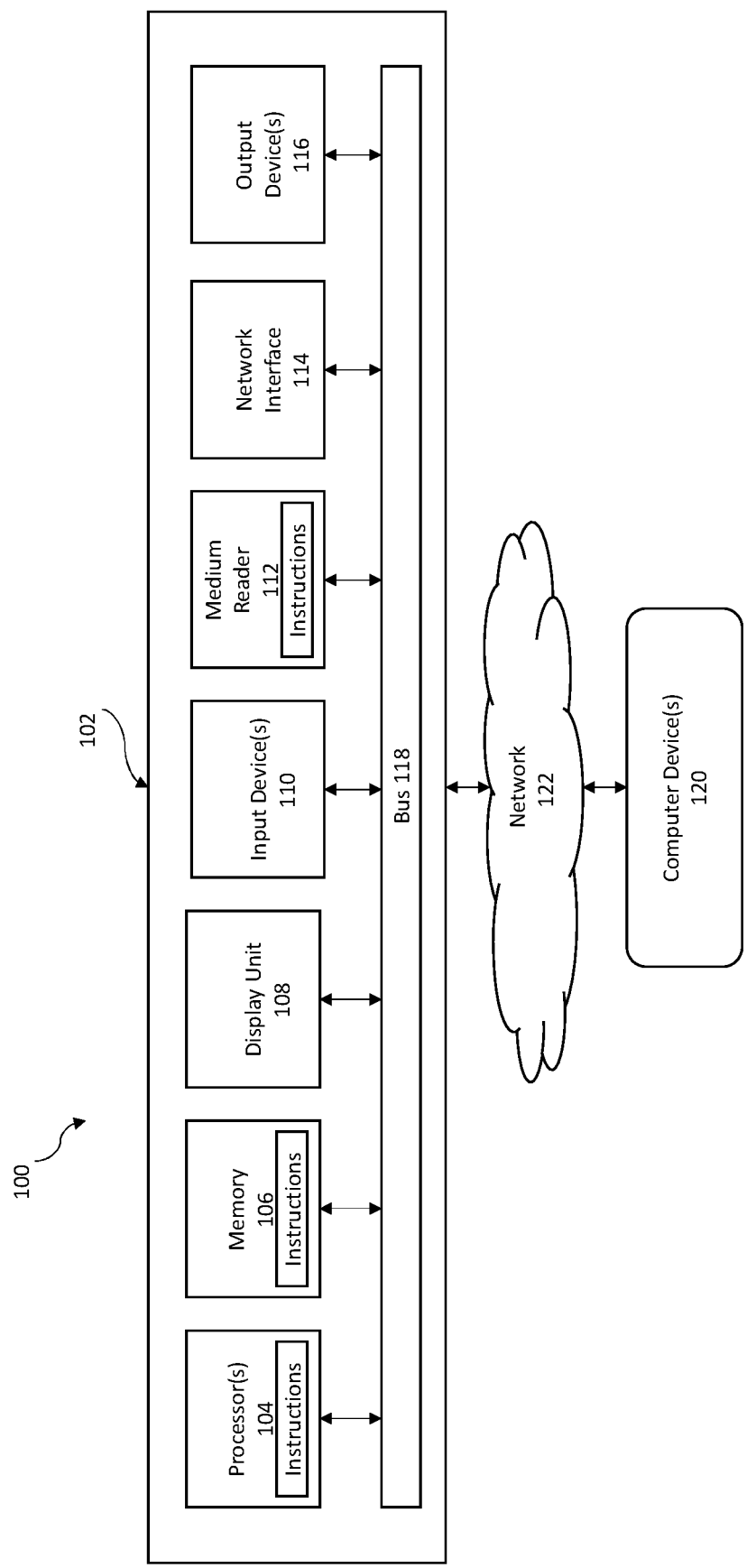
FIG. 1 illustrates an exemplary computer system for recommending an agile software framework methodology, in accordance with an exemplary embodiment.

Exemplary embodiments now will be described with reference to the accompanying drawings. The invention may, however, be embodied in many different forms and should not be construed as limited to the embodiments set forth herein; rather, these embodiments are provided so that this invention will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

The specification may refer to "an", "one" or "some" embodiment(s) in several locations. This does not necessarily imply that each such reference is to the same embodiment(s), or that the feature only applies to a single embodiment. Single features of different embodiments may also be combined to enable other embodiments.

As used herein, the singular forms "a", "an" and "the" are intended to include the plural forms as well, unless expressly stated otherwise. It will be further understood that the terms "include", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations and arrangements of one or more of the associated listed items. Also, as used herein, the phrase "at least one" means and includes "one or more" and such phrases or terms can be used interchangeably.

Unless otherwise defined, all terms (including technical and scientific terms) used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different.

In addition, all logical units and/or controllers described and depicted in the figures include the software and/or hardware components required for the unit to function. Further, each unit may comprise within itself one or more components, which are implicitly understood. These components may be operatively coupled to each other and be configured to communicate with each other to perform the function of the said unit.

In the following description, for the purposes of explanation, numerous specific details have been set forth in order to enable a description of the invention. It will be apparent, however, that the invention may be practiced without these specific details and features.

Through one or more of its various aspects, embodiments and/or specific features or sub-components of the present disclosure, are intended to bring out one or more of the advantages as specifically described above and noted below.

The examples may also be embodied as one or more non-transitory computer-readable storage media having instructions stored thereon for one or more aspects of the present technology as described and illustrated by way of the examples herein. The instructions in some examples include executable code that, when executed by one or more processors, causes the processors to carry out steps necessary to implement the methods of the examples of this technology that are described and illustrated herein.

To overcome the problems associated with the selection of a suitable and appropriate agile software framework methodology based on product or project lifecycle, development phase, and team end goal, the present disclosure provides a method and system for recommending an agile software framework methodology via the recommendation engine.

Therefore, the present disclosure aids in the selection of the right methodology for different types of software projects, such as, but not limited to, product development, feature development, fixed cost projects, fixed requirements projects, continuous scope change projects, maintenance of projects, and enhancement of projects. The present disclosure uses collective human wisdom and recommendations to provide the user with the best methodology based on the requirements of the user. The present disclosure may choose various development tools with no or minimal human intervention in an automated intelligent manner. The present disclosure may automate the repeated tasks in managing the project(s), such as, but not limited to, setting up meetings, stakeholder management, and milestone-based team rewards. The present disclosure may understand and learn from various voice-based input, text-based input, sign language-based input, and multi-language inputs including the technical jargon from the software developers to enhance the productivity in software development.

The present disclosure first receives at least one input from a user. The at least one input may be received as voice-based input, text-based input, sign language-based input, multi-language based input, and the like for the development of a product. Next, the at least one input is analysed using a Natural Language Understanding (NLU) & Natural Language Processing (NLP) to understand the information received in the input of the user. Next, the analysed input is passed to Control Mechanism Engine for authentication and authorization of the input. Next, the present disclosure recommends at least one suitable agile methodology for the user using the recommendation engine, based on the analysed input and based on the analysis of the training dataset.

As used herein, the agile framework methodologies include but are not limited, to Scrum, Kanban, Extreme Programming (XP), Dynamic Systems Development Method (DDSM), Feature Driven Development (FDD), Adaptive Software Development (ASD), The Crystal Method, Lean Software Development (LSD), Disciplined Agile.

Next, the present disclosure receives feedback from the user on the recommendation of at least one agile methodology. The user may either accept the recommended agile methodology or reject the recommended agile methodology, followed by an explanation of the reason in case the user rejects the recommended agile methodology. Next, the present disclosure creates, using a squad agile engine, a set of tasks for the recommended agile methodology in case the user selects the recommended agile methodology. The present disclosure uses different service engines to create the respect tasks for the recommended agile methodology. Next, the present disclosure executes, using the action engine, the set of tasks for the recommended agile methodology. The present disclosure further assists the user in performing a plurality of assistance-based tasks such as, but not limited to, receiving input from the user, setting calls, setting meetings, sharing progress meetings, and the like.

FIG. 1 is an exemplary system for use in accordance with the embodiments described herein. The system 100 is generally shown and may include a computer system 102, which is generally indicated. The term "computer system" may also be referred to as "computing device" and such phrases/terms can be used interchangeably in the specifications.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks, or cloud-based environment. Even further, the instructions may be operative in such cloud-based computing environment.

In a networked deployment, the computer system 102 may operate in the capacity of a server or as a client-user computer in a server-client user network environment, a client-user computer in a cloud-based computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smartphone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As used herein, the database includes a set of data received from the user for software development, the training dataset associated with the training of the recommendation engine, and the like.

As illustrated in FIG. 1, the computer system 102 may include at least one processor 104, processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. Processor 104 is an article of manufacture and/or a machine component. The processor 104 is configured to execute software instructions in order to perform functions as described in the various embodiments herein. The processor 104 may be a general-purpose processor or may be part of an application-specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable storage mediums from which data and executable instructions can be read by a computer. Memories, as described herein, may be random access memory (RAM), read-only memory (ROM), flash memory, electrically programmable read-only memory (EPROM), electrically erasable programmable read-only memory (EEPROM), registers, a hard disk, a cache, a removable disk, tape, compact disk read-only memory (CD-ROM), digital versatile disk (DVD), floppy disk, Blu-ray disk, or any other form of storage medium known in the art. Memories may be volatile or non-volatile, secure and/or encrypted, unsecure and/or unencrypted. As regards the present disclosure, the computer memory 106 may comprise any combination of memories or a single storage.

The computer system 102 may further include a Display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as but not limited to, a network interface 114 and an output device 116. The output device 116 may be, but is not limited to, a speaker, an audio out, a video out, a remote-control output, a printer, or any combination thereof. Additionally, the term "Network interface" may also be referred to as "Communication interface" and such phrases/terms can be used interchangeably in the specifications.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect expresses, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near-field communication, ultra-band, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present disclosure, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present disclosure. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments disclose methods and systems for recommending an agile software framework methodology via the recommendation engine based on user inputs and feedbacks.

Figure 2:
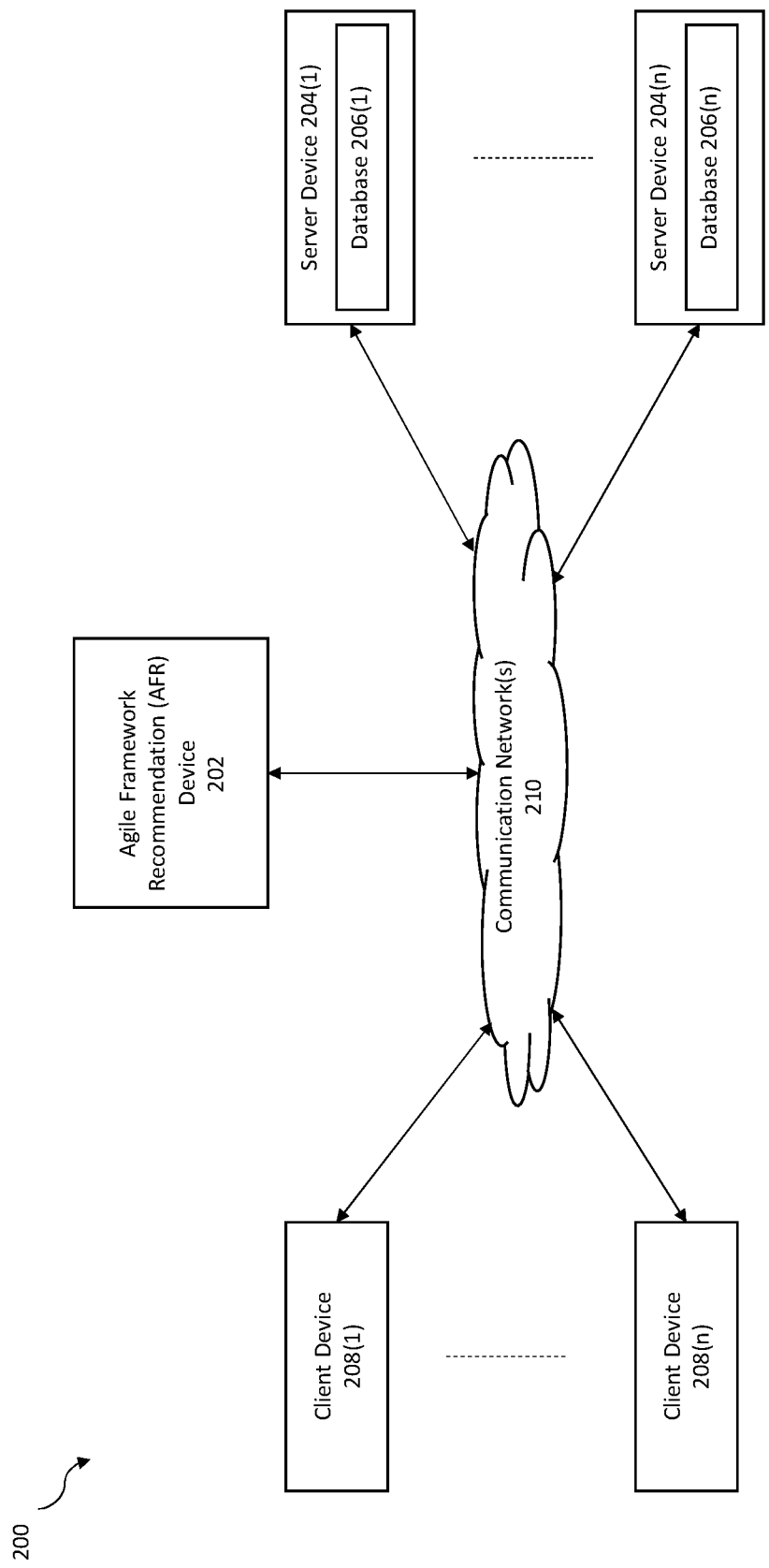
FIG. 2 illustrates an exemplary diagram of a network environment for recommending an agile software framework methodology, in accordance with an exemplary embodiment.

Referring to FIG. 2, a schematic of an exemplary network environment 200 for implementing a method for recommending an agile software framework methodology via a recommendation engine is illustrated. In an exemplary embodiment, the method is executable on any networked computer platform, such as, for example, a personal computer (PC).

The method for recommending agile software framework methodology may be implemented by an Agile Framework Recommendation (AFR) device 202. The AFR device 202 may be the same or similar to the computer system 102 as described with respect to FIG. 1. The AFR device 202 may store one or more applications that can include executable instructions that, when executed by the AFR device 202, cause the AFR device 202 to perform desired actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

In a non-limiting example, the application(s) may be operative in a cloud-based computing environment. The application(s) may be executed within or as a virtual machine(s) or virtual server(s) that may be managed in a cloud-based computing environment. Also, the application(s), and even the AFR device 202 itself, may be located in the virtual server(s) running in a cloud-based computing environment rather than being tied to one or more specific physical network computing devices. Also, the application(s) may be running in one or more virtual machines (VMs) executing on the AFR device 202. Additionally, in one or more embodiments of this technology, virtual machine(s) running on the AFR device 202 may be managed or supervised by a hypervisor.

In the network environment 200 of FIG. 2, the AFR device 202 is coupled to a plurality of server devices 204(1)-204(n) that hosts a plurality of databases 206(1)-206(n), and also to a plurality of client devices 208(1)-208(n) via communication network(s) 210. A communication interface of the AFR device 202, such as the network interface 114 of the computer system 102 of FIG. 1, operatively couples and communicates between the AFR device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the AFR device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer-readable storage media, and AFR devices that efficiently implement the method for recommending the agile software framework methodology via the recommendation engine.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Networks (PSTNs), Ethernet-based Packet Data Networks (PDNs), combinations thereof, and the like.

The AFR device 202 may be a standalone device or integrated with one or more other devices or apparatuses, such as one or more of the server devices 204(1)-204(n), for example. In one particular example, the AFR device 202 may include or be hosted by one of the server devices 204(1)-204(n), and other arrangements are also possible. Moreover, one or more of the devices of the AFR device 202 may be in the same or a different communication network including one or more public, private, or cloud-based networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. In an example, the server devices 204(1)-204(n) may process requests received from the AFR device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to the agile framework methodology and different parameters.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) is not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to-peer architecture, virtual machines, or within a cloud-based architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the AFR device 202 via a communication network(s) 210. Accordingly, the client devices 208(1)-208(n) may be mobile computing devices, desktop computing devices, laptop computing devices, tablet computing devices, or the like, that host chat, e-mail, or voice-to-text applications, for example. In an exemplary embodiment, at least one client device 208 is a wireless mobile communication device, e.g., a smartphone.

The client devices 208(1)-208(n) may run interface applications, such as standard web browsers or standalone client applications, which may provide an interface to communicate with the AFR device 202 via the communication network(s) 210 to communicate user requests and information. The client devices 208(1)-208(n) may further include, among other features, a display device, such as a display screen or touchscreen, and/or an input device, such as a keyboard.

Although the exemplary network environment 200 with the AFR device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the AFR device 202, the server devices 204(1)-204(n), or the client devices 208(1)-208(n), for example, may be configured to operate as virtual instances on the same physical machine. In other words, one or more of the AFR devices 202, the server devices 204(1)-204(n), or the client devices 208(1)-208(n) may operate on the same physical device rather than as separate devices communicating through communication network(s) 210.

Additionally, there may be more or fewer AFR devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
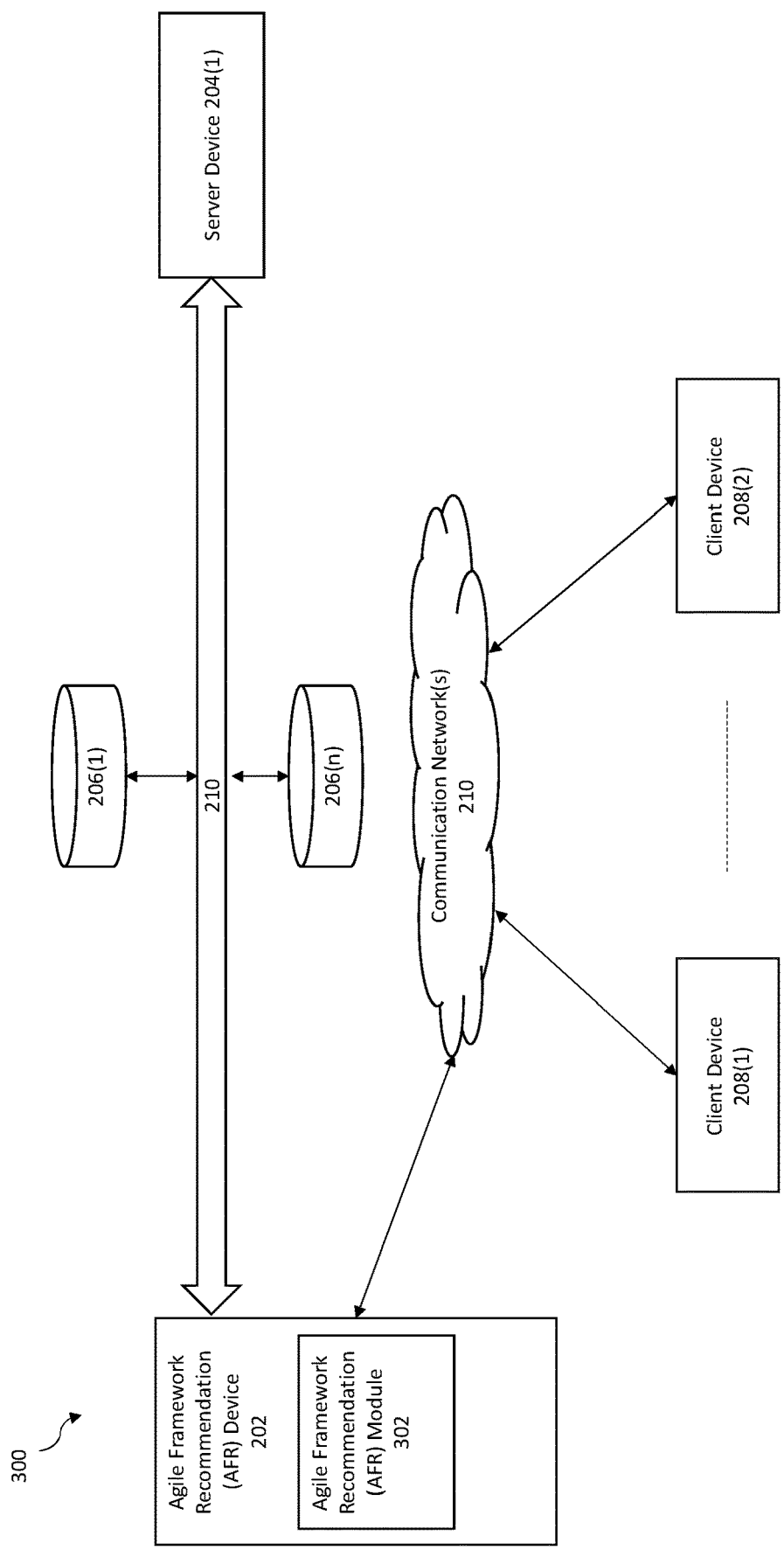
FIG. 3 illustrates an exemplary system for recommending an agile software framework methodology, in accordance with an exemplary embodiment.

FIG. 3 illustrates an exemplary system for implementing a method for recommending an agile framework methodology via a recommendation engine in accordance with an exemplary embodiment. As illustrated in FIG. 3, according to exemplary embodiments, the system 300 may comprise an AFR device 202 including an Agile Framework Recommendation (AFR) module 302 that may be connected to a server device 204(1) and one or more repository 206(1) . . . 206(n) via a communication network 210, but the present disclosure is not limited thereto.

The AFR device 202 is described and shown in FIG. 3 as including the AFR module 302, although it may include other rules, policies, modules, databases, or applications, for example. As will be described below, the AFR module 302 is configured to implement the method for recommending the agile software framework methodology via the recommendation engine.

An exemplary process 300 for implementing a method for recommending the agile software framework methodology via the recommendation engine utilizing the network environment of FIG. 2 is shown as being executed in FIG. 3. Specifically, the first client device 208(1) and a second client device 208(2) are illustrated as being in communication with AFR device 202. In this regard, the first client device 208(1) and the second client device 208(2) may be "clients" of the AFR device 202 and are described herein as such. Nevertheless, it is to be known and understood that the first client device 208(1) and/or the second client device 208(2) need not necessarily be "clients" of the AFR device 202, or any entity described in association therewith herein. Any additional or alternative relationship may exist between either or both of the first client device 208(1) and the second client device 208(2) and the AFR device 202, or no relationship may exist.

Further, AFR device 202 is illustrated as being able to access one or more repositories 206(1) . . . 206(n). The AFR module 302 may be configured to access these repositories/databases for implementing the method for recommending the agile software framework methodology via the recommendation engine.

The first client device 208(1) may be, for example, a smartphone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the AFR device 202 via broadband or cellular communication. Of course, these embodiments are merely exemplary and are not limiting or exhaustive.

Figure 4:
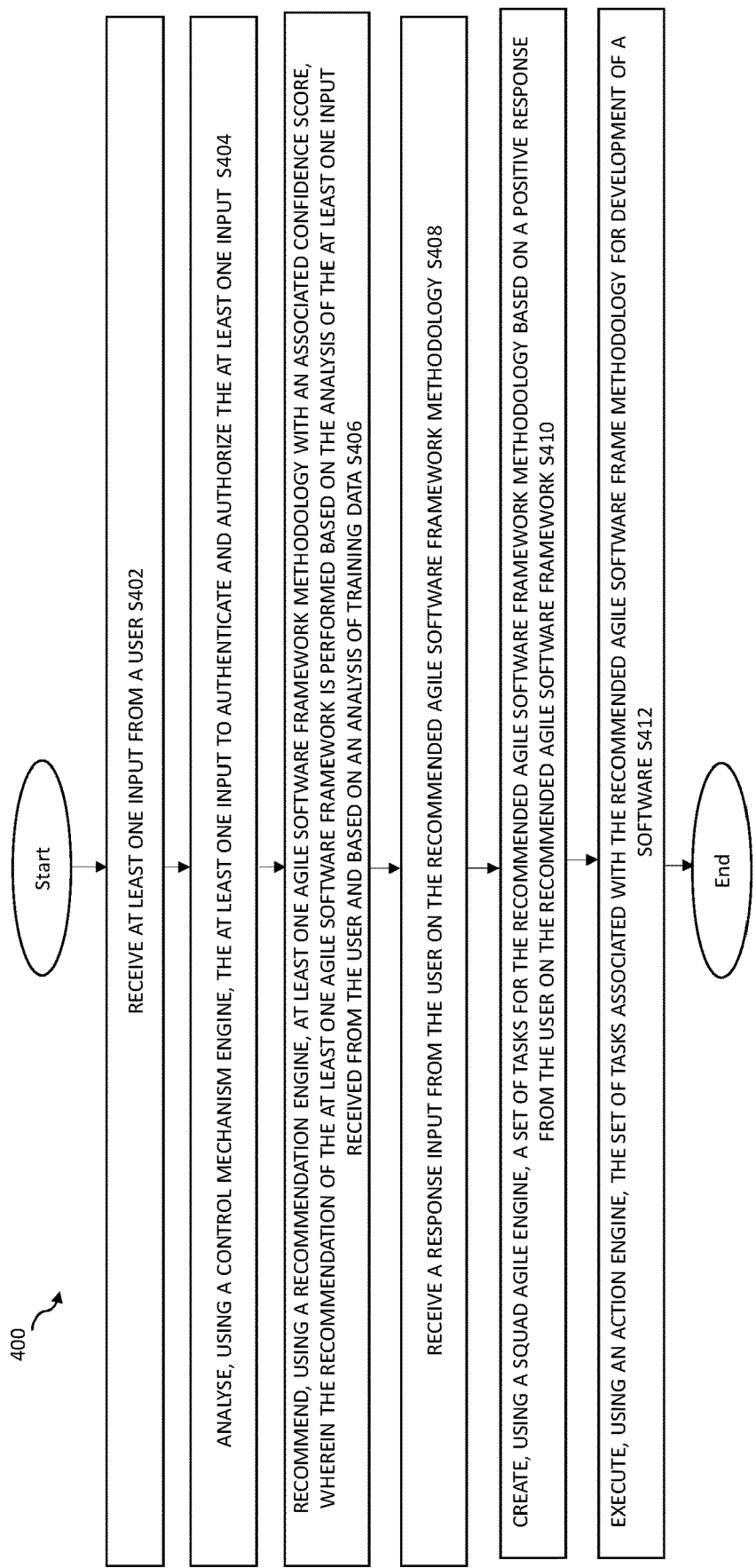
FIG. 4 illustrates an exemplary method flow diagram for recommending an agile software framework methodology, in accordance with an exemplary embodiment.

Referring to FIG. 4, exemplary method 400 is shown for recommending an agile software framework methodology via a recommendation engine, in accordance with an exemplary embodiment. As shown in FIG. 4, the method begins following a need for the selection of an optimized agile software framework methodology.

At step S402, the method includes receiving, by the at least one processor 104, at least one input from a user. The at least one input is received as one of voice-based input, text-based input, sign language-based input, multi-language based input, or any combination thereof. The at least one input includes information associated with the software development team, information associated with requested completion timelines, and information associated with the various requirements in development of a software. In a non-limiting example, the at least one input includes team size, team experience, team members, change in requirements, velocity, team aptitude, end goal, expected project completion time, and the like. In an example, the input received in the form of voice, or sign language is converted into the text format for further analysis of the received input. In another example, the input received in other languages may first translated into the required language (say EN) using the translator and then uploaded on the system via an agent (or conversational engine) in the input fields. In a non-limiting embodiment, the conversational engine is capable of understanding all the intents using a Natural Language Generation Engine that has been trained using techniques such as NLU & NLP that works like an agile agent.

At step S404, the method includes analysing, by the at least one processor 104 using a control mechanism engine, the at least one input to authenticate and authorize the at least one input. In exemplary embodiment, the at least one input is analysed using NLU, NLP, statistical-based techniques to filter the input. The filtering of the input is performed for authentication and authorization of the input, training of the system, recommendation of the framework, and the like. After successful authentication and authorization of the at least input, the step of recommendation of at least one agile software framework methodology is performed.

At step S406, the method includes recommending, by the at least one processor 104 using a recommendation engine, at least one agile software framework methodology with an associated confidence score. The recommendation of the at least one agile software framework is performed based on the analysis of the at least one input received from the user and based on an analysis of training data. The training data comprises information associated with previous outcomes of different factors for different products, domains, combinations of resources, experience history, code commit history, behavior analysis, documentation, and feedback of users on the past recommendations or combinations thereof.

In another exemplary embodiment, the recommendation of the best-suited Agile Framework methodology is performed by determining different factors associated with at least one input received from the user (such as voice-based input, text-based input, sign-based (video) input for users with disabilities) and derived behavioral collective model by learning from the previous outcomes of different factors for different products, domains, combination of resources, experience history, code commit history, behavior analysis, documentation and combination of this with others and providing a confidence scoring to back its recommendation.

The recommendation engine employed by the processor 104 in step S406 may use various algorithms (such as machine learning-based algorithms) to analyze the at least one input received from the user and the training data stored in a database. In an example, the recommendation engine uses a recurrent neural network for the recommendation of the at least one agile software framework methodology. Further, the recommendation engine also learns with reinforcement learning techniques to better recommend and perform tasks efficiently as time passes.

In another exemplary embodiment, the recommendation engine employs input fields provided by the user to interface with a model trained with the training dataset. The trained model generates output in the form of recommendations for suitable agile methodologies for product development, ordered according to confidence scores. Additionally, the model is trained using the recurrent neural network architecture, which facilitates error propagation through previous layers, enabling continuous learning from mistakes (errors) and ongoing improvement in accuracy. Furthermore, the model possesses the capability to analyze the present experience of project development cycles or user feedback, allowing for iterative retraining based on new experiences.

The method further includes ranking, by the at least one processor 104 using the recommendation engine, a plurality of agile software framework methodology based on their corresponding confidence score. Next, the method includes displaying, by the at least one processor 104 using the recommendation engine, the plurality of agile software framework methodology with their corresponding confidence score. In an example, the recommendation engine displays the recommended Agile Methodology 1 with a confidence score of 90%, Agile Methodology 2 with a confidence score of 75%, Agile Methodology 3 with a confidence score of 60%, and Agile Methodology 4 with a confidence score of 50% to allow the user to select the best suited Agile Methodology with highest confidence score. In an example, the system recommends Agile Methodology 1 to the user out of the plurality of Agile Methodologies due to having the highest confidence score of the Agile Methodology 1. The recommendation of the Agile Methodologies further depends on the user requirements and inputs.

At step S408, the method includes receiving, by the at least one processor 104, a response input from the user on the recommended agile software framework methodology. The response input from the user on the recommended agile software framework methodology comprises one of a positive response to accept the recommended agile software framework methodology and a negative response to reject the recommended agile software framework, along with feedback on the corresponding response. In an example, the user may accept the recommended agile software framework or may choose any particular agile methodology from the displayed list.

Further, the recommendation engine collects feed from the user associated with acceptance or rejection of the recommended agile methodology. If the user rejects the recommended methodology, then the system asks the user to provide reasons associated with the decision of the user. In an example, the system asks the user why he thinks the other methodology will be beneficial and why will it be beneficial, which in turn feeds into the recommendation engine and thus repeated process becomes the input source of collective wisdom for the recommendation engine to foster better recommendation next time.

At step S410, the method includes creating, by the at least one processor 104 using a squad agile engine, a set of tasks for the recommended agile software framework methodology based on a positive response from the user on the recommended agile software framework. In exemplary embodiment, the method includes the step of preparing the action plan and then creating the task actions for the congenial development experience, with the needed development tools and product development tools, and other utilities for making the experience of product development good and automatic. In an example, the squad agile engine takes care of everything related to the proposed agile methodology and uses different service engines that are responsible for creating the set of tasks to be followed for the development of the software. In another exemplary embodiment, the squad agile engine has various service engines that are responsible for various task creations that include but are not limited to, defining projects, story creation, and story points. In another exemplary embodiment, the selection of the service engines depends on the agile methodology recommended and selected by the user.

At step S412, the method includes executing, by the at least one processor 104 using an action engine, the set of tasks associated with the recommended agile software frame methodology for the development of the software. In exemplary embodiment, the action engine takes input from the mapped service engine for the recommended agile methodology and creates a list of actions to be executed for that particular task. In an example, the actions for the execution of the tasks include but are not limited to creating a project board, creating stories, epics, and the like. Once the list of actions is ready, the action engine passes the list to a squad of product development tools that execute all the actions required for the software development. Once the action process is completed, the system asks the user for the need for a personalized agile assistant. Thus, the method further comprises the step of assisting, by the at least one processor 104 using an agile assistant feature, the user with a plurality of assistance tasks required for the recommendation and the execution of the agile software frame methodology.

In another exemplary embodiment, the agile assistant serves as a personalized agent designed to function as an agile guide for the software development team or project team. The training of the agile assistant is performed training using reinforcement-based learning techniques and operates as a conversational engine. The agile assistant possesses the ability to facilitate various agile ceremonies, such as daily standups, retrospectives, gathering updates from developers, and clarifying requirements, among others. Further, operating on a reward-based system metric, the agile assistant assigns positive points to tasks completed successfully and deducts negative points for issues like spillage. Further, the agile assistant strives to maximize rewards and leverages its learning capabilities to continuously improve based on experience.

Figure 5:
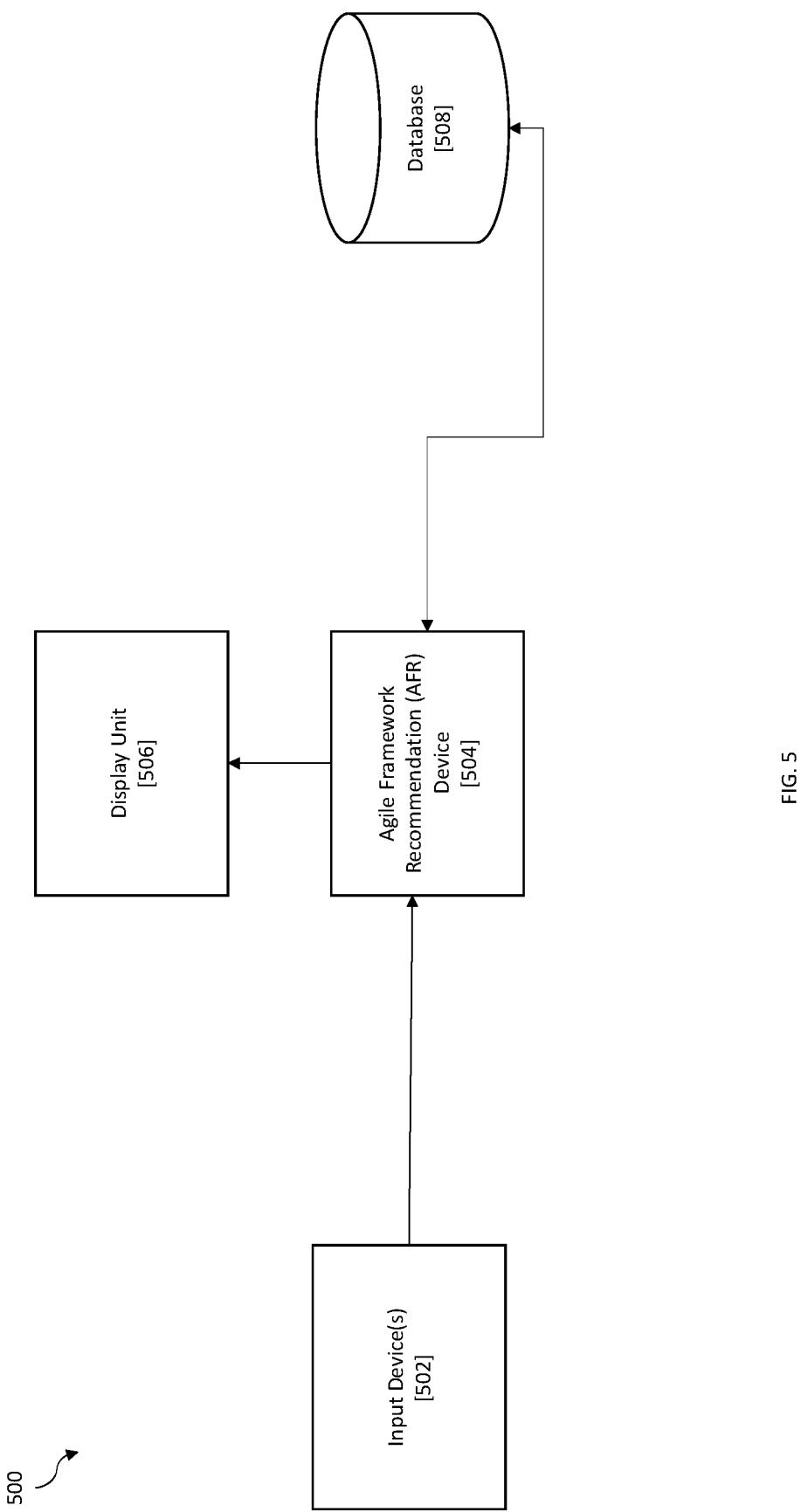
FIG. 5 illustrates a process flow diagram for implementing a method for recommending an agile software framework methodology using an agile framework recommendation device, in accordance with an exemplary embodiment.

FIG. 5 illustrates a process flow diagram for implementing a method for recommending an agile software framework methodology in accordance with an exemplary embodiment. As illustrated in FIG. 5, the process flow 500 begins with an input of at least one product(s) or project(s) requirement from at least one entity such as a user or an employee of the organization or project manager using an input device(s) 502. In a non-limiting embodiment, user input may be a text-based input, voice-based input, or sign-language-based input. Further, the at least one input received from the at least one entity is handled by the Agile Framework Recommendation (AFR) device 504. The AFR device 504 recommends the agile framework methodology to the user based on user input, previous experience, a trained model with ranking and confidence score for the respective methodology, which the user may access through a display unit 506. The user may provide a response associated with the selection or rejection of the recommendation along with feedback(s) on the decision. The feedback received from the user is also relevant in updating the entries of the database 508 and for further training of the ML-based model of the AFR device 504.

Figure 6:
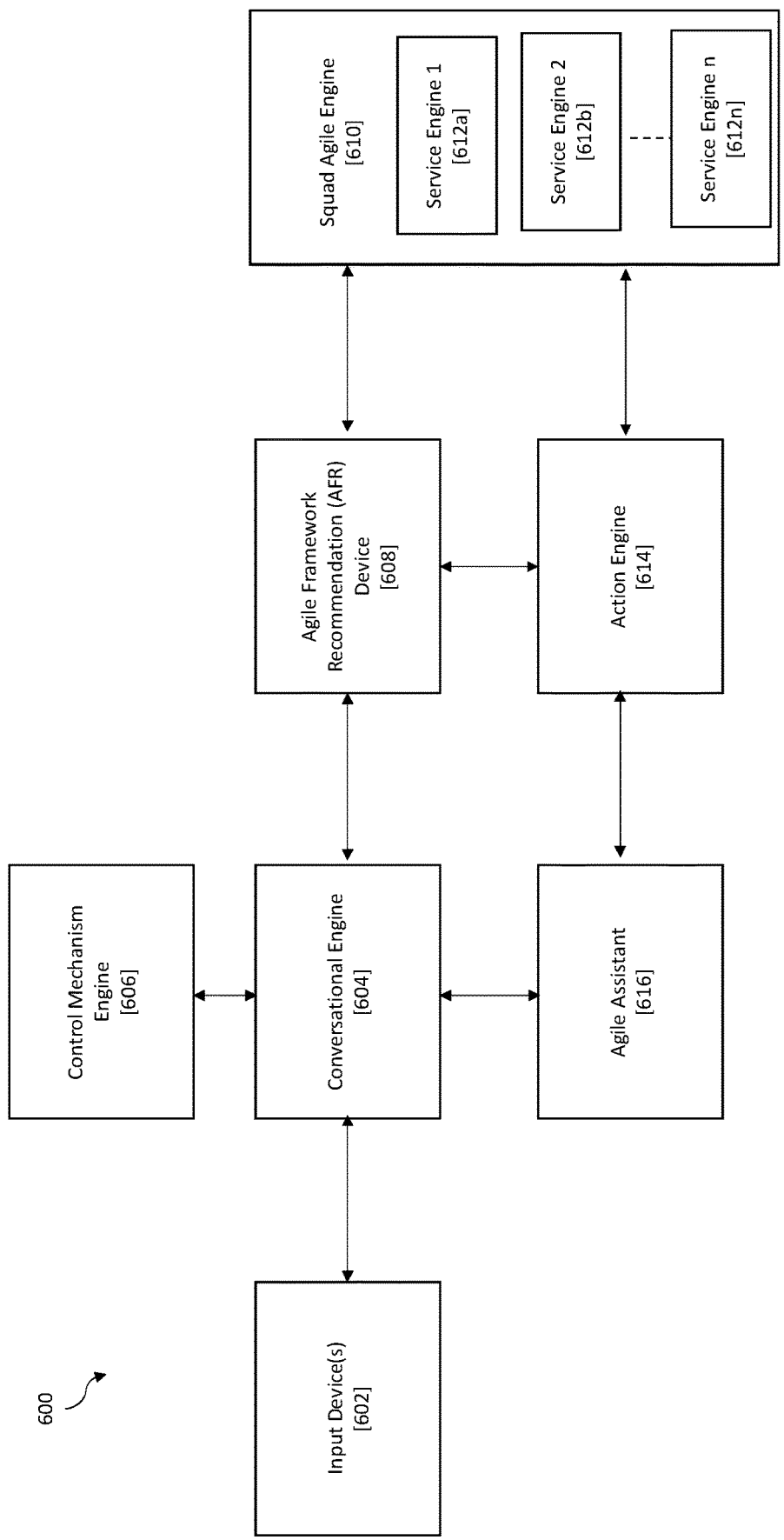
FIG. 6 illustrates a process flow diagram for implementing a method for recommending an agile software framework methodology, in accordance with an exemplary embodiment.

FIG. 6 illustrates a process flow for implementing a method for recommending an agile software framework methodology via a recommendation engine in accordance with an exemplary embodiment. As illustrated in FIG. 6, the process flow 600 begins with an input of at least a project or product from at least one entity such as a user, an employee, or a team member using an input device(s) 602. In exemplary embodiment, user input may be in the form of voice, text, sign language, or multi-language. The user may provide input associated with the project or product such as, but not limited to, product or project lifecycle, development phase, team end goal, team experience, change in requirement, and the like to conversational engine 604. In another exemplary embodiment, the conversational engine 604 may understand all the intents using a natural language generation engine that has been trained using techniques like NLU & NLP that operate like an agile agent. In an exemplary embodiment, there may be one or more input analyzer, which may work with the conversational engine 604 and may handle different kinds of inputs like voice, text, and sign language with multi-language support capabilities. Further, there may be at least one control mechanism engine 606, which may authenticate and authorize the user for interaction. The conversational engine 604 sends output based on user input to the agile framework recommendation (AFR) 608 device.

In exemplary embodiment, the AFR 608 device may work on a recurrent neural network (RNN). The AFR 608 device takes user input and recommends the methodology with ranking and confidence score to the user based on user inputs and derived behavioral collective model by learning from the previous similar projects or products, domains, combination of resources, experience history, code commit history, behavior analysis, documentation and combination of this with others. The AFR 608 device takes feedback from the user for the recommended methodology framework. The user may provide feedback with additional reasoning or any input(s) for cause or description for selection, rejection, or customization of the recommended methodology. The AFR 608 device may feed this user experience and may be used for training the model and for recommending the best suitable framework methodology for the user. The AFR 608 device uses trained models and human behavioral models to foster better recommendations next time to the user. The AFR 608 device provides user-selected methodology information to squad agile engine 610.

According to an exemplary embodiment, the squad agile engine 610 after receiving input from the AFR 608 device takes care of everything related to the proposed agile methodology and uses different service engines 612a-612n that are responsible for creating all the required tasks to be followed and calls mapped action engine 614 that executes those tasks. The service engines 612a-612n may perform various tasks such as defining the project, story creation, story points, and the like. In an exemplary embodiment, the service engines created tasks for the selected methodology look like:

Scrum: "Define Project", "Create Epics in JIRA", "Participant Identification", "Draft Stories", "Draft Story Points", "Priotorise Backlog items", "Define Sprint Goal", "Define Sprint Timeline", "Scrum Master Agent", "Schedule events and meetings", . . . , "Other suitable tasks"

Kanban: "Define Project", "Draft Stories", "Groom Backlog with Priority", "Flow Manager Agent", . . . , "Other suitable tasks"

eXtream Programming (XP): "Define Project", "Draft Stories", "Groom Backlog with Priority", "Define Milestone", "XP Coach Agent", . . . , "Other suitable tasks"

The Service Engine is selected according to an agile methodology that gives a task of a list of actions to be executed to action engine 614.

According to an exemplary embodiment, the action engine 614 takes input from the mapped service engines 612a-612n for the recommended agile methodology and creates a list of actions to be executed for that particular task. The actions include but are not limited to creating a project board, creating stories, epics, and the like. Below are the examples of action items to be executed for different agile methodologies.

"Define Project": ["Create a project in JIRA Board", . . . , "Other tasks"]

"Create Epics in JIRA": ["Create a project in JIRA Board if not done already", "Create Epics in JIRA", . . . , "Other tasks"]

"Groom Backlog with Priority": ["Create a project in JIRA Board if not done already", "Create Epics in JIRA", "Create Stories in JIRA", "Groom Backlog with Priority", . . . , "Other tasks"]

"Scrum Master Agent": ["Invoke Scrum Master Agile Assistant"]

"Flow Manager Agent": ["Invoke Flow Manager Agile Assistant"]

"XP Coach Agent": ["Invoke XP Coach Agile Assistant"]

In an exemplary embodiment, the list of actions of action engine 614 may be passed to the squad of product development tools that execute all the actions triggered by the action engine. Once the action process is completed, the system 600 may ask the user to have a personalized agile assistant or not.

According to an exemplary embodiment, the agile assistant 616 serves as a personalized agent designed to function as an agile guide for users, employees, or teams. The agile assistant 616 may be trained using reinforcement-based learning techniques and may operate as a conversational engine 604 for interaction with the user. The agile assistant 616 possesses the ability to facilitate various agile ceremonies, such as, but not limited to, daily standups, retrospectives, gathering updates from developers, and clarifying requirements, among others. The agile assistant 616, operating on a reward-based system metric, assigns positive points to tasks completed successfully and deducts negative points for issues like spillage. It consistently strives to maximize rewards and leverages its learning capabilities to continuously improve based on experience. In an exemplary embodiment, below are the sample tasks performed by the agile assistant 616:

"Scrum Master Agile Assistant": ["Scheduling Scrum Standup Meetings", "Setup meetings for any impediments", "Set up retrospective", "share velocity of team", "PO colloboration and communication", . . . , "other suitable actions"]

"XP Coach Agile Assistant": ["Technically unblock the team", "setup progress meetings", "priority setup of items based on historical data", "share Lead time of the item", . . . , "other suitable actions"]

Accordingly, with this technology, a method and system for recommending agile software framework methodology via the recommendation engine are disclosed. As evident from the above disclosure, the present solution provides significant technical advancement over existing solutions by ensuring suitable and best framework methodology recommendation, based on user input(s) and previous learned experience and trained model, to the user or employee of the organization or any team member and the like.

The present disclosure further provides various advantages that includes but are not limited to providing a collective wisdom and recommendation to guide to choose the methodology, automatic intelligent in choosing the development tools with no or minimal human intervention, intelligently automate the repeated tasks in managing the project(s) like setting up meetings, stakeholder management, milestone based team rewarding, agile assistant act as a coach/master/flow manager/chief architect/programmer depending on the recommended methodology and role acumen, creates congenial environment for software development team in turn increasing the team morale and motivation, intelligently understands and learn from different voice, text, sign language inputs from the software developers including the technical jargons to do the action needed for better software development productivity and increased team engagements and also will help in delivery of a better product in stipulated, agreed time and money.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials, and embodiments, the invention is not intended to be limited to the particulars disclosed; rather the invention extends to all functionally equivalent structures, methods, and uses such as are within the scope of the appended claims.

For example, while the computer-readable storage medium may be described as a single medium, the term "computer-readable storage medium" includes a single medium or multiple media, such as a centralized or distributed database, and/or associated caches and servers that store one or more sets of instructions. The terms "computer-readable medium" and "computer-readable storage medium" shall also include any medium that is capable of storing, encoding, or carrying a set of instructions for execution by a processor or that causes a computer system to perform any one or more of the embodiments disclosed herein.

The computer-readable storage medium may comprise a non-transitory computer-readable storage medium or media and/or comprise a transitory computer-readable storage medium or media. In a particular non-limiting, exemplary embodiment, the computer-readable storage medium can include a solid-state memory such as a memory card or other package that houses one or more non-volatile read-only memories. Further, the computer-readable storage medium can be a random-access memory or other volatile re-writable memory. Additionally, the computer-readable storage medium can include a magneto-optical or optical medium, such as a disk or tape, or other storage device to capture carrier wave signals such as a signal communicated over a transmission medium. Accordingly, the present disclosure is considered to include any computer-readable storage medium or other equivalents and successor media, in which data or instructions may be stored.

Although the present application describes specific embodiments which may be implemented as computer programs or code segments in computer-readable storage media, it is to be understood that dedicated hardware implementations, such as application-specific integrated circuits, programmable logic arrays, and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

According to an aspect of the present disclosure, a non-transitory computer-readable storage medium storing instructions for recommending an agile framework methodology is disclosed. The storage medium includes executable code which, when executed by a processor, may cause the processor to receive at least one input from a user; analyze, using a control mechanism engine, the at least one input to authenticate and authorize the at least one input; recommend, using a recommendation engine, at least one agile software framework methodology with an associated confidence score, wherein the recommendation of the at least one agile software framework is performed based on the analysis of the at least one input received from the user and based on the analysis of training data; receive a response input from the user on the recommended agile software framework methodology; create, using a squad agile engine, a set of tasks for the recommended agile software framework methodology based on a positive response from the user on the recommended agile software framework; and execute, using an action engine, the set of tasks associated with the recommended agile software frame methodology for development of the software.

Although the present specification describes components and functions that may be implemented in particular embodiments with reference to particular standards and protocols, the present disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to enable a general understanding of the various embodiments. The illustrations are not intended to serve as a complete description of all of the elements and features of apparatus and systems that utilize the structures or methods described herein. Many other embodiments may be apparent to those of skill in the art upon reviewing the present disclosure. Other embodiments may be utilized and derived from the present disclosure, such that structural and logical substitutions and changes may be made without departing from the scope of the present disclosure. Additionally, the illustrations are merely representational and may not be drawn to scale. Certain proportions within the illustrations may be exaggerated, while other proportions may be minimized. Accordingly, the present disclosure and the figures are to be regarded as illustrative rather than restrictive.

One or more embodiments of the present disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the present disclosure is submitted with the understanding that it will not be used to interpret or limit the scope or meaning of the claims. In addition, in the foregoing Detailed Description, various features may be grouped together or described in a single embodiment for the purpose of streamlining the present disclosure. This disclosure is not to be interpreted as reflecting an intention that the claimed embodiments require more features than are expressly recited in each claim. Rather, as the following claims reflect, the inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

We claim:

1. A method for recommending an agile software framework methodology, the method being implemented by at least one processor, the method comprising:
   receiving, by the at least one processor, at least one input from a user;
   analyzing, by the at least one processor using a control mechanism engine, the at least one input to authenticate and authorize the at least one input;
   recommending, by the at least one processor using a recommendation engine, at least one agile software framework methodology with an associated confidence score, wherein the recommendation of the at least one agile software framework is performed based on the analysis of the at least one input received from the user and based on an analysis of training data;
   receiving, by the at least one processor, a response input from the user on the recommended agile software framework methodology;
   creating, by the at least one processor using a squad agile engine, a set of tasks for the recommended agile software framework methodology based on a positive response from the user on the recommended agile software framework; and
   executing, by the at least one processor using an action engine, the set of tasks associated with the recommended agile software frame methodology for development of a software.

2. The method as claimed in claim 1, wherein the at least one input is received as one of voice-based input, text-based input, sign language-based input, or any combination thereof.

3. The method as claimed in claim 1, wherein the at least one input comprises information associated with a software development team, information associated with requested completion timelines, and information associated with various requirements in the development of the software.

4. The method as claimed in claim 1, wherein the training data comprises information associated with previous outcomes of different factors for different products, domains, combination of resources, experience history, code commit history, behavior analysis, documentation, feedback of users on past recommendations or combinations thereof.

5. The method as claimed in claim 1, wherein the method further comprises:
   ranking, by the at least one processor using the recommendation engine, a plurality of agile software framework methodology based on their corresponding confidence score;
   displaying, by the at least one processor using the recommendation engine, the plurality of agile software framework methodology with their corresponding confidence score.

6. The method as claimed in claim 1, wherein the response input from the user on the recommended agile software framework methodology comprises one of the positive response to accept the recommended agile software framework methodology and a negative response to reject the recommended agile software framework, along with feedback on the corresponding response.

7. The method as claimed in claim 1, wherein the method further comprises assisting, by the at least one processor using an agile assistant feature, the user with a plurality of assistance tasks required for the recommendation and the execution of the agile software frame methodology.

8. A computing device configured to implement an execution of a method for recommending an agile software framework methodology, the computing device comprising:
   a processor;
   a memory; and
   a communication interface coupled to each of the processor and the memory, wherein the processor is configured to:
   receive at least one input from a user;
   analyze, using a control mechanism engine, the at least one input to authenticate and authorize the at least one input;
   recommend, using a recommendation engine, at least one agile software framework methodology with an associated confidence score, wherein the recommendation of the at least one agile software framework is performed based on the analysis of the at least one input received from the user and based on an analysis of training data;
   receive a response input from the user on the recommended agile software framework methodology;
   create, using a squad agile engine, a set of tasks for the recommended agile software framework methodology based on a positive response from the user on the recommended agile software framework; and execute, using an action engine, the set of tasks associated with the recommended agile software frame methodology for development of a software.

9. The computing device as claimed in claim 8, wherein the at least one input is received as one of voice-based input, text-based input, sign language-based input, or any combination thereof.

10. The computing device as claimed in claim 8, wherein the at least one input comprises information associated with a software development team, information associated with requested completion timelines, and information associated with the various requirements in the development of the software.

11. The computing device as claimed in claim 8, wherein the training data comprises information associated with previous outcomes of different factors for different products, domains, combinations of resources, experience history, code commit history, behavior analysis, documentation, and feedback of users on past recommendations or combinations thereof.

12. The computing device as claimed in claim 8, wherein the processor is further configured to:
 rank, using the recommendation engine, a plurality of agile software framework methodology based on their corresponding confidence score;
 display, using the recommendation engine, the plurality of agile software framework methodology with their corresponding confidence score.

13. The computing device as claimed in claim 8, wherein the response input from the user on the recommended agile software framework methodology comprises one of the positive response to accept the recommended agile software framework methodology and a negative response to reject the recommended agile software framework, along with feedback on the corresponding response.

14. The computing device as claimed in claim 8, wherein the processor is further configured to assist, using an agile assistant feature, the user with a plurality of assistance tasks required for the recommendation and the execution of the agile software frame methodology.

15. A non-transitory computer readable storage medium storing instructions for recommending an agile framework methodology, the storage medium comprising executable code which, when executed by a processor, causes the processor to:
 receive at least one input from a user;
 analyze, using a control mechanism engine, the at least one input to authenticate and authorize the at least one input;
 recommend, using a recommendation engine, at least one agile software framework methodology with an associated confidence score, wherein the recommendation of the at least one agile software framework is performed based on the analysis of the at least one input received from the user and based on the analysis of training data;
 receive a response input from the user on the recommended agile software framework methodology;
 create, using a squad agile engine, a set of tasks for the recommended agile software framework methodology based on a positive response from the user on the recommended agile software framework; and
 execute, using an action engine, the set of tasks associated with the recommended agile software frame methodology for development of a software.

16. The storage medium as claimed in claim 15, wherein the at least one input is received as one of voice-based input, text-based input, sign language-based input, or any combination thereof, wherein the at least one input comprises information associated with a software development team, information associated with requested completion timelines, and information associated with the various requirements in the development of the software.

17. The storage medium as claimed in claim 15, wherein the training data comprises information associated with previous outcomes of different factors for different products, domains, combinations of resources, experience history, code commit history, behavior analysis, documentation, and feedback of users on past recommendations or combinations thereof.

18. The storage medium as claimed in claim 15, wherein when executed by the processor, the executable code further causes the processor to:
 rank, using the recommendation engine, a plurality of agile software framework methodology based on their corresponding confidence score;
 display, using the recommendation engine, the plurality of agile software framework methodology with their corresponding confidence score.

19. The storage medium as claimed in claim 15, wherein the response input from the user on the recommended agile software framework methodology comprises one of the positive response to accept the recommended agile software framework methodology and a negative response to reject the recommended agile software framework, along with feedback on the corresponding response.

20. The storage medium as claimed in claim 15, wherein when executed by the processor, the executable code further causes processor to assist, using an agile assistant feature, the user with a plurality of assistance tasks required for the recommendation and the execution of the agile software frame methodology.

* * * * *